United States Patent
Humer et al.

(10) Patent No.: US 6,631,949 B2
(45) Date of Patent: *Oct. 14, 2003

(54) VARIABLE MOVEMENT HEADREST ARRANGEMENT

(75) Inventors: Mladen Humer, East Pointe, MI (US); Yan Fan, Bloomfield, MI (US); Magnus Roland, Vänersborg (SE)

(73) Assignee: Lear Corporation, Southfield, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/185,198

(22) Filed: Jun. 28, 2002

(65) Prior Publication Data

US 2003/0015897 A1 Jan. 23, 2003

Related U.S. Application Data

(60) Provisional application No. 60/302,016, filed on Jun. 29, 2001, provisional application No. 60/302,019, filed on Jun. 29, 2001, and provisional application No. 60/302,024, filed on Jun. 29, 2001.

(51) Int. Cl.[7] .............................. B60N 2/42; A47C 1/10
(52) U.S. Cl. .................... 297/216.12; 297/408; 297/410
(58) Field of Search .......................... 297/216.12, 410, 297/408

(56) References Cited

U.S. PATENT DOCUMENTS

| | | | |
|---|---|---|---|
| 2,636,552 A | | 4/1953 | Long |
| 2,869,622 A | * | 1/1959 | Petersen et al. ............ 297/396 |
| 3,802,737 A | | 4/1974 | Mertens |
| 3,838,870 A | | 10/1974 | Hug |
| 4,977,973 A | * | 12/1990 | Takizawa ..................... 180/271 |
| 5,011,225 A | * | 4/1991 | Nemoto ....................... 297/408 |
| 5,145,233 A | | 9/1992 | Nagashima |
| 5,378,043 A | | 1/1995 | Viano et al. |
| 5,437,494 A | | 8/1995 | Beauvais |
| 5,505,520 A | | 4/1996 | Frusti et al. |
| 5,509,716 A | | 4/1996 | Kolena et al. |
| 5,795,019 A | | 8/1998 | Wieclawski |
| 5,927,804 A | * | 7/1999 | Cuevas .................. 297/216.12 |
| 6,022,074 A | | 2/2000 | Swedenklef |
| 6,213,549 B1 | | 4/2001 | Wieclawski |
| 6,273,511 B1 | | 8/2001 | Wieclawski |
| 6,375,262 B1 | * | 4/2002 | Watanabe ................. 297/284.4 |
| 6,416,125 B1 | | 7/2002 | Shah et al. |
| 6,478,373 B1 | * | 11/2002 | Hake et al. ............. 297/216.13 |
| 6,485,096 B1 | * | 11/2002 | Azar et al. ..................... 297/61 |

FOREIGN PATENT DOCUMENTS

| | | |
|---|---|---|
| DE | 23 37 521 | 2/1975 |
| FR | 2 590 529 | 5/1987 |
| FR | 2 602 133 | 2/1988 |
| FR | 2 680 484 | 2/1993 |
| JP | 49-25690 | 7/1974 |
| JP | 7-291005 | 11/1995 |
| WO | WO 87/03256 | 6/1987 |
| WO | WO 98/09838 | 3/1998 |

* cited by examiner

*Primary Examiner*—Peter M. Cuomo
*Assistant Examiner*—Sarah C. Burnham
(74) *Attorney, Agent, or Firm*—Bill C. Panagos

(57) ABSTRACT

The present invention involves a vehicle seat and headrest arrangement for use with a seat having a seatback in a vehicle. The vehicle seat and headrest arrangement comprises a headrest arrangement including a headrest, at least one impact target, and at least one of a guide member and a follower. The seatback has at least one of the other of a guide member and follower. The guide member has a guideway and the follower engages the guideway of the guide member such that upon impact to the vehicle a rearward load by the occupant upon the impact target will cause the follower to engage the guideway in such a manner as to cause the headrest to be moved in a first manner and a second manner so as to support the head of an occupant.

25 Claims, 5 Drawing Sheets

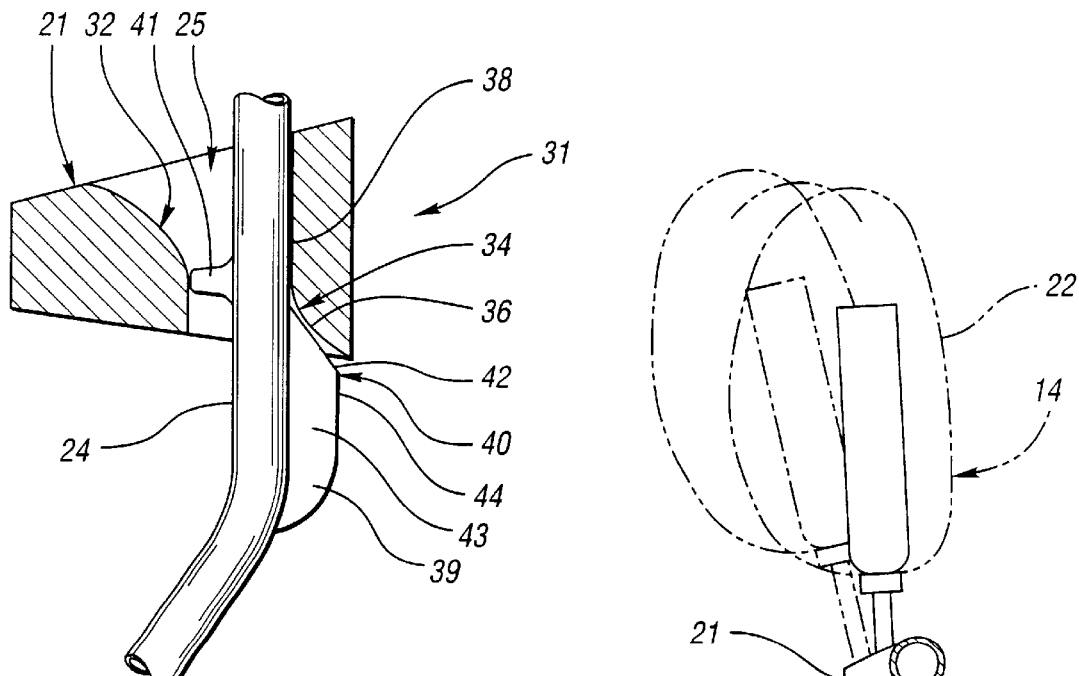
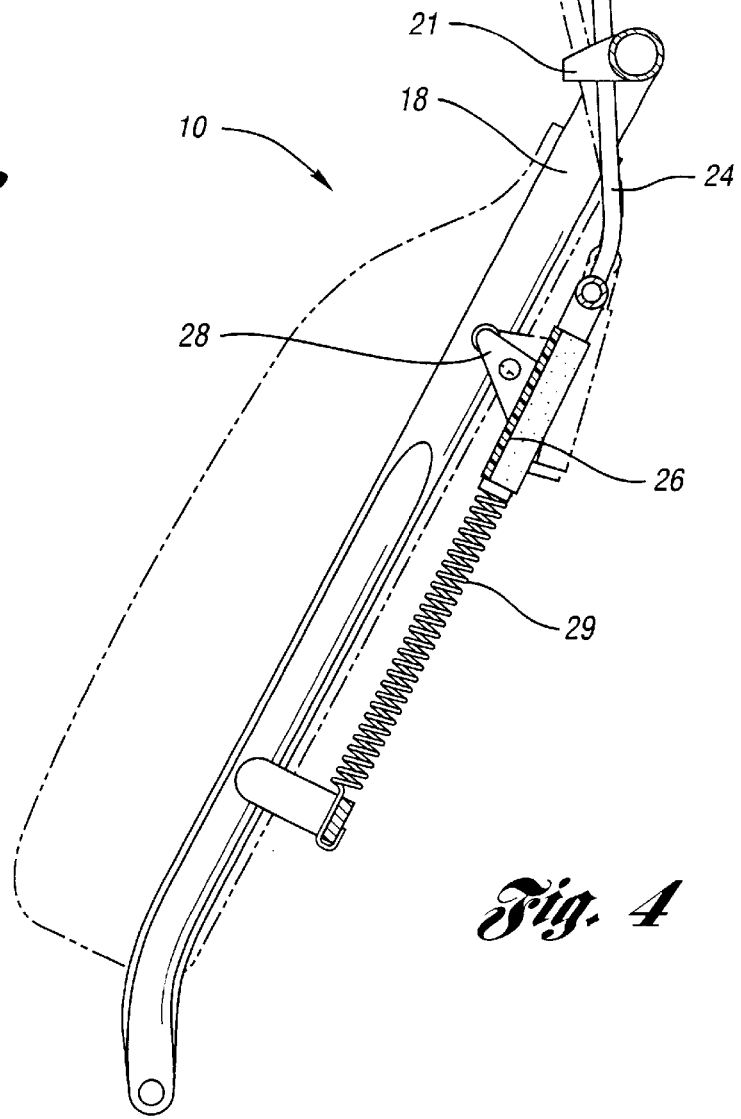
Fig. 3
Fig. 4

VARIABLE MOVEMENT HEADREST ARRANGEMENT

CROSS-REFERENCE TO RELATED APPLICATIONS

This application claims the benefit of U.S. provisional application Ser. Nos. 60/302,016; 60/302,024; and 60/302,019, all filed on Jun. 29, 2001.

BACKGROUND OF THE INVENTION

1. Field of the Invention

The present invention relates to a variable movement headrest arrangement for providing support to the head of an occupant of a vehicle upon vehicle impact.

2. Background Art

Improvements in safety mechanisms in the automotive industry continue to be made year after year. Such safety mechanisms include safety headrests. Example safety seat headrests can be found in Viano et al., U.S. Pat. No. 5,378,043, which is incorporated herein by reference. Such safety headrest mechanisms provide support to the head of a vehicle occupant during crash situations.

More specifically, upon rear impact of a vehicle, the occupant of the vehicle compresses into the vehicle seatback, as the head, neck, and torso move substantially in unison. There typically is greater compression in the torso and buttocks regions than in the shoulder region of the occupant. Thus, it has been a concern that the seatback may possibly deflect under the torso and buttocks load before the head and neck of the occupant contacts the headrest attached to the seatback.

Upon front impact of a vehicle, an occupant of the vehicle moves forward relative to the vehicle seatback. Upon contact with a front interior panel or a deployed air bag from the front panel, the occupant experiences rebound movement in a rearward direction. Similar to a rear impact situation as described above, the occupant in such a situation would then provide a rearward load into the seatback and compress into the vehicle seatback, as the head, neck, torso, and buttocks move substantially in unison. Thus, in a front impact it is also a concern that the seatback may possibly deflect under the torso load prior to the head and neck of the occupant contacting the headrest.

As a result, safety headrest mechanisms have been designed such that, upon rear impact, the occupant's torso contacts an impact target of a vehicle seat with a rearward load or force. The impact target is operatively connected to a headrest cushion portion such that, upon the rearward load on the impact target, the headrest cushion portion moves forwardly toward the head of the occupant. The forward movement of the cushion portion in the crash situation lessens the gap which may exist between the head of the occupant and the headrest cushion portion, preventing or decreasing the risk of whiplash to the occupant.

However, it would be desirable to have the headrest arrangement move forward at a higher velocity to decrease the gap more quickly, but without contacting the occupant's head while moving at the higher velocity.

SUMMARY OF THE INVENTION

It is an object of the present invention to provide a cost effective mechanism to support the head of an occupant of a vehicle upon vehicle impact.

In carrying out the above object, and other objects and features of the invention, a new vehicle seat and headrest arrangement for use with a seat having a seatback in a vehicle is provided. The vehicle seat and headrest arrangement comprises a headrest arrangement including a headrest, at least one impact target, and at least one of a guide member and a follower. The seatback has the other at least one of a guide member and follower. The guide member has a guideway and the follower engages the guideway of the guide member such that upon impact to the vehicle a rearward load by the occupant upon the impact target will cause the follower to engage the guideway in such a manner to cause the headrest to be moved in a first manner and a second manner to support the head of an occupant.

In a more specific embodiment, the guide member is a bushing having a cam configuration and the follower is a cam such that engagement of the cam and cam configuration together with the forward momentum of the headrest cause the headrest to move in a first manner and a second manner.

In another more specific embodiment, the guideway has a first guideway wall and a second guideway wall and the follower has a first follower portion and a second follower portion which engage the first guideway wall and second guideway wall respectively to cause the headrest to move in a first manner and a second manner to support the head of an occupant. The second guideway wall may have a first contact portion and a second contact portion and the second follower portion may have a first surface portion and a second surface portion such that upon impact to the vehicle, the first surface portion slidingly engages the first contact portion while the first follower portion slidingly engages the first guideway wall so as to cause the headrest to move in a first manner before the second surface portion slidingly engages the second contact portion as first follower portion continues to slidingly engage the first guideway wall so as to cause the headrest to move in a second manner. The first contact portion may have a relatively curved surface configuration, the second contact portion may have a relatively flat surface configuration, the first and second surface portions may have relatively flat surface configurations, the first guideway wall may have a relatively curved surface configuration, and first follower portion may have an arcuately-topped protrusion configuration.

In another more specific embodiment, the vehicle seat and headrest arrangement further includes a movement-allowing connector connected between the headrest arrangement and the seatback.

In another more specific embodiment, the seatback may have a seatback frame having side members and the movement-allowing connector may be at least one link pivotally connected between the side members of the seatback frame and the impact target. The link may be connected to the side member along a pivot axis offset relative to the impact target such that a rearward force of an occupant on the impact target will tend to cause the impact target to move in a generally rearward and upward direction and move the headrest arrangement In another more specific embodiment, the vehicle seat and headrest arrangement further includes a biasing member operatively associated with the seatback and the headrest arrangement which tends to bias the headrest against movement in a first and second manner.

In another more specific embodiment, movement in a first manner is movement on a first trajectory and at a first forward velocity and movement in a second manner is movement on a second trajectory and at a second forward velocity which is less than the first forward velocity.

The vehicle seat and headrest arrangement for use with a seat having a seatback in a vehicle may also comprise a headrest arrangement including a headrest and a headrest extension, the headrest extension having at least one of a guide member and a follower and an impact target located below the at least one of a guide member and a follower. A seatback frame of the seatback has an upper cross frame member. The upper cross frame member has at least one of a guide member and follower, the guide member has a guideway and the follower slidingly engaging the guideway of the guide member such that upon impact to the vehicle a rearward load by the occupant upon the impact target will cause the follower to be slidably guided by the guideway such that the headrest is moved in a first manner and a second manner.

In a more specific embodiment, the vehicle seat and headrest arrangement further includes a movement-allowing connector connected between the headrest arrangement and the seatback frame. The movement-allowing connector may be at least one link pivotally connected between the side members of the seatback frame and the impact target. The link may be connected to the side member along a pivot axis offset relative to the impact target such that a rearward force of an occupant on the impact target will tend to cause the impact target to move in a generally rearward and upward direction and move the headrest arrangement.

In another more specific embodiment, the vehicle seat and headrest arrangement further includes a biasing member operatively associated with the seatback and the headrest arrangement which tends to bias the headrest against movement in a first and second manner.

In another more specific embodiment, the guide member is fixedly attached to the seatback frame and has a first guideway wall and a second guideway wall and the follower is fixedly attached to the headrest extension and has a first follower portion and a second follower portion which slidingly engage the first guideway wall and second guideway wall respectively. The second guideway wall may have a first contact portion and a second contact portion and the second follower portion may have a first surface portion and a second surface portion such that upon impact to the vehicle the first surface portion slidingly engages the first contact portion while the first follower portion slidingly engages the first guideway wall so as to cause the headrest to move in a first manner before the second surface portion slidingly engages the second contact portion as first follower portion continues to slidingly engage the first guideway wall so as to cause the headrest to move in a second manner. The first contact portion may have a relatively curved surface configuration, the second contact portion may have a relatively flat surface configuration, the first and second surface portions may have relatively flat surface configurations, the first guideway wall may have a relatively curved surface configuration, and first follower portion may have an arcuately-topped protrusion configuration.

In another more specific embodiment, movement in a first manner is movement on a first trajectory and at a first forward velocity and movement in a second manner is movement on a second trajectory which is generally more upwardly than the first trajectory and a second forward velocity which is less than the first forward velocity The vehicle seat and headrest arrangement for use with a seat having a seatback in a vehicle may also comprise a headrest arrangement including a headrest and a headrest extension, the headrest extension having a follower fixedly connected to the headrest extension and an impact target located below the follower. A seatback frame of the seatback has side members and an upper cross frame member. The upper cross frame member has a guide member fixedly connected to the cross frame member through which the follower extends and the guide member has a guideway. The follower slidingly engaging the guideway of the guide member such that upon impact to the vehicle a rearward load by the occupant upon the impact target will cause the follower to be slidably guided by the guideway such that the headrest is moved in a first manner and a second manner.

In a more specific embodiment, the vehicle seat and headrest arrangement further includes a movement-allowing connector and a biasing member, the movement-allowing connector being at least one link pivotally connected between the side members of the seatback frame and the impact target and the link being connected to the side member along a pivot axis offset relative to the impact target such that a rearward force of an occupant on the impact target will tend to cause the impact target to move in a generally rearward and upward direction and move the headrest assembly, the biasing member being operatively connected between the seatback frame and the headrest arrangement so as to bias the headrest against movement in a first and second manner.

In another more specific embodiment, movement in a first manner is movement on a first trajectory and at a first forward velocity and movement in a second manner is movement on a second trajectory which is generally more upwardly than the first trajectory and a second forward velocity which is less than the first forward velocity.

In another more specific embodiment, the second guideway wall has a first contact portion and a second contact portion and the second follower portion has a first surface portion and a second surface portion such that upon impact to the vehicle, the first surface portion slidingly engages the first contact portion while the first follower portion slidingly engages the first guideway wall so as to cause the headrest to move in a first manner before the second surface portion slidingly engages the second contact portion as first follower portion continues to slidingly engage the first guideway wall so as to cause the headrest to move in a second manner. The first contact portion may have a relatively curved surface configuration, the second contact portion may have a relatively flat surface configuration, the first and second surface portions may have relatively flat surface configurations, the first guideway wall may have a relatively curved surface configuration, and first follower portion may have an arcuately-topped protrusion configuration.

BRIEF DESCRIPTION OF THE DRAWINGS

FIG. 3 is a cross-section view of the variable pivot mechanism for the headrest of FIG. 2 taken along lines 3—3;

FIG. 4 is a cross-section view of FIG. 2 along lines 4—4 showing movement of the headrest upon impact in accordance with the present invention;

DETAILED DESCRIPTION OF THE PREFERRED EMBODIMENTS

Figure 1:
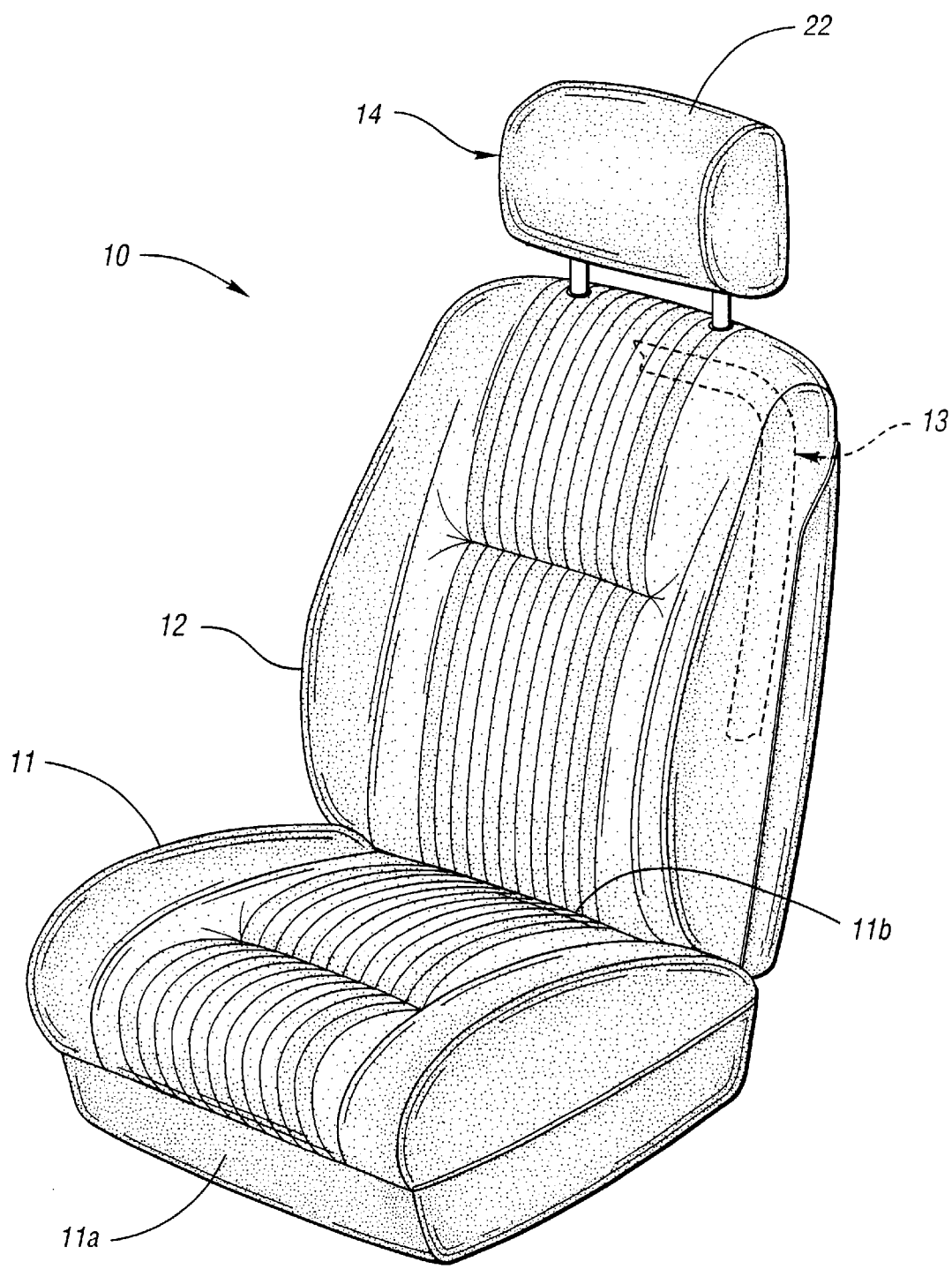
FIG. 1 is a perspective view of a vehicle seat and headrest arrangement in accordance with one embodiment of the present invention.

FIG. 1 illustrates a vehicle seat and headrest arrangement 10 having seat bottom 11 with fore end 11a and aft end 11b, seatback 12 with seatback frame 13 joined to seat bottom 11 adjacent aft end 11b, and headrest arrangement 14 pivotally and slidably attached to seatback frame 13. Headrest arrangement 14 includes moveable headrest 22 which, in this and in most typical embodiments, is cushioned. As will be described in greater detail below, headrest 22 moves variably upon vehicle impact. In the embodiment shown, such variable movement occurs in first and second manners wherein the first and second manners relate to first and second forward velocities respectively, those being the velocities of the headrest 22 forward toward the occupant or the front of the vehicle, and first and second trajectories respectively, those being the trajectories or paths of headrest 22. Such variable movement could be along any suitable combination of trajectories and velocities. As long as at least one of the first forward velocity and first trajectory is different than one of a second forward velocity and second trajectory, movement in first and second manners, variable movement, has been achieved.

However, as will be explained in more detail, in the event of a vehicle impact, it is preferable that the headrest move in a first manner so as to more quickly lessen the gap between the head of an occupant and the headrest 22 and move in a second manner so as to decrease the forward velocity and provide support upon contact with the occupant's head. More specifically, prior to impact of a vehicle in which the seat is located, headrest 22 is in a normal position. In the embodiment shown, upon impact of the vehicle, headrest 22 moves at first and second forward velocities and in first and second trajectories. First, the headrest 22 moves at the first forward velocity and in the first trajectory to quickly decrease any gap between the head of an occupant and the headrest portion 22. Then, the headrest 22 moves at the second forward velocity and in the second trajectory such that the velocity of the headrest 22 movement relative to the head of the occupant of the seat is decreased and so as to provide support to the occupant's head upon contact with the headrest 22.

Figure 2:
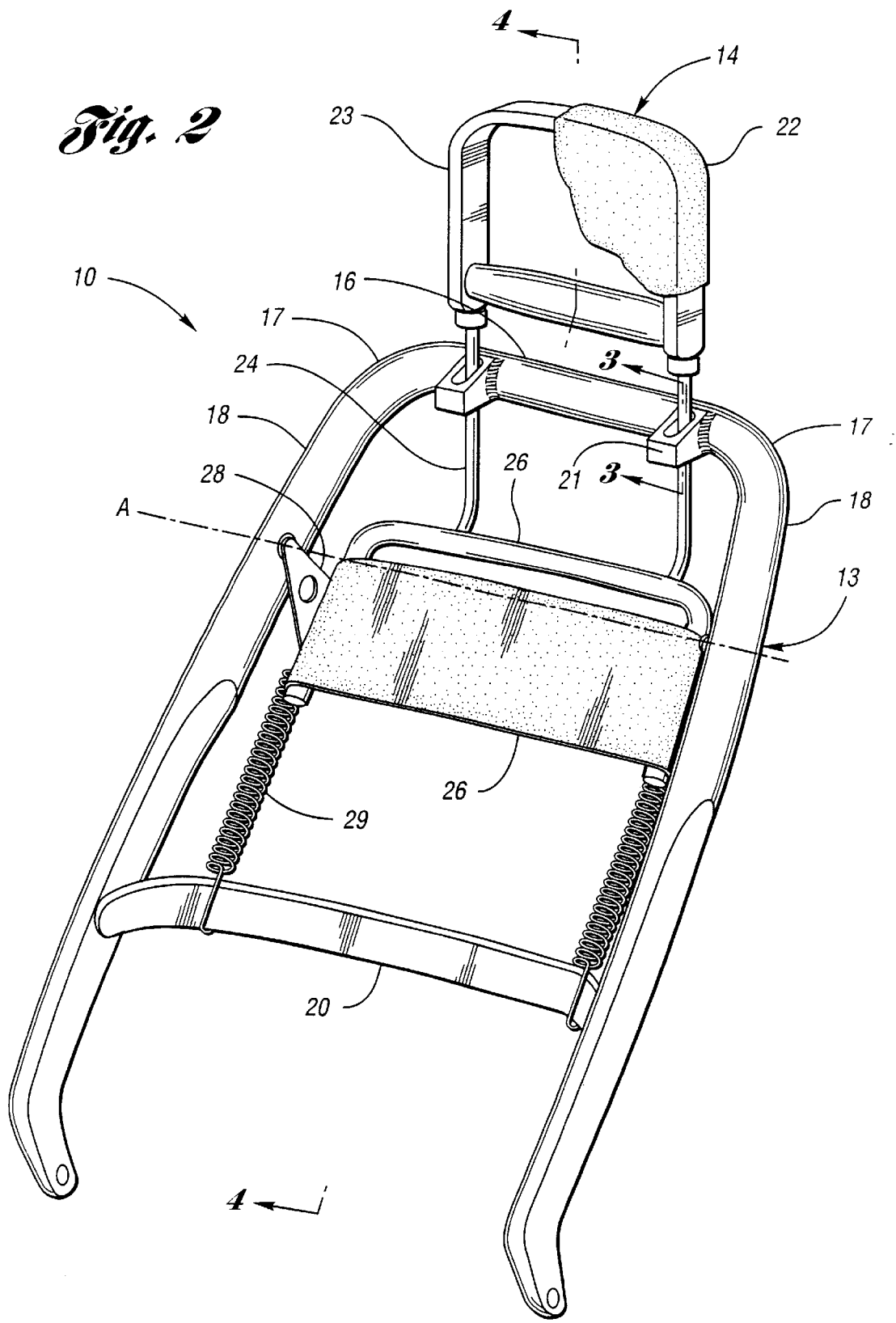
FIG. 2 is a perspective view of a variable pivot mechanism for a headrest on a seatback frame in accordance with one embodiment of the present invention.

FIG. 2 depicts headrest arrangement 14 movable with respect to seatback frame 13. As shown, seatback frame 13 includes upper cross member 16 having ends 17, each of which has a side member 18 integrally attached thereto and extending downwardly therefrom. Lower cross member 20 extends across seatback frame 13 to connect side members 18. Lower cross member 20 may be attached to side members 18 by any suitable means, such as by welds or bolts (not shown).

In this embodiment, the upper cross member 16 includes at least one guide member, in this embodiment bushings 21. Such bushings may be attached to the cross member 16 or formed within the cross member 16. While not shown, the guide members could also be connected to any part of the seatback frame. Furthermore, the guide members, such as the bushings 21 shown, may be fixedly, rotatably, or otherwise movably connected to seatback frame 13 by any suitable means. In this embodiment, bushings 21 are welded to upper cross member 16.

As shown, headrest arrangement 14 includes headrest 22 having cushion frame 23, headrest extension 24 extending downwardly therefrom, and impact target 26 to which extension 24 extends. The impact target 26 may have any suitable configuration or shape and may be made from any suitable material. In this embodiment, impact target 26 is disposed within seatback frame 13 and between side members 18. The headrest 22 and impact target 26 are operatively associated as the headrest arrangement 14 moves variably with respect to the seat back frame 13. As described in greater detail below, headrest arrangement 14 cooperates with seatback frame 13 to define shifting axes about which headrest arrangement 14 pivots.

As depicted in FIGS. 2 and 3, headrest extension 24 extends downwardly from cushion frame 23 through each guide member, in this embodiment bushings 21, to an impact target 26. Each guide member defines a guideway, in this embodiment guideway 25. As shown, the headrest extension 24 in this embodiment constitutes two posts. However, a single post or any other suitable extension may be utilized. Likewise, a single guide member or any other suitable number of guide members may be utilized. Furthermore, while not shown the headrest extension of the headrest arrangement could include or constitute an upper portion or part of the seatback frame such that the upper portion or part could move variably.

As shown in this embodiment, one or more movement-allowing connectors 28, such as links or hinges shown, may be used to pivotally or otherwise suitably attach impact target 26 to side members 18. Such movement-allowing connectors 28 may be connected at each end to the impact target 26 and side member 18 respectively, in a pivotal, fixed, or otherwise suitable manner. More specifically, as shown in the embodiment depicted, each of the movement-allowing connectors 28 may be pivotally attached to the seatback frame 13 on pivot axis A generally perpendicular to the fore and aft direction. The other end of the movement-allowing connector may also be pivotally attached to the impact target 26. As shown in FIGS. 2 and 4, the pivot axis A is offset relative to the impact target 26 such that a rearward force applied to the impact target 26 will tend to cause the movement-allowing connector 28 to pivot about the pivot axis A and the impact target to move in a generally rearward and upward direction. Of course, any other suitable movement-allowing connector 28 between the impact target 26 and the side member 18, or between any suitable portion of the headrest arrangement 14 and the seatback frame 13, could be used, such as multiple linkages for example, such that the impact target pivots about a fixed or variable (instantaneous) pivot axis.

Rearward loading of impact target 26 will cause headrest 22 to pivot toward the head of the occupant. Preferably, a suitable biasing member is operatively associated with the seatback frame 13 and headrest arrangement 14 in order to bias headrest arrangement 14 against such movement. As shown in this embodiment, such biasing member may consist of springs 29 attached between the lower cross member 20 and each link 28. However, such biasing member may be operatively associated with or between the seatback frame 13 and headrest arrangement 14 in any suitable manner. Furthermore, while in this embodiment, spring 29 is a metallic coil, any suitable biasing member, such as an elastic tube, may be used.

As shown in FIG. 3, in one embodiment of the present invention the guide member, in this embodiment the bushing 21, includes a guideway 25, which in this embodiment includes a cam configuration 31 having a first movement portion and a second movement portion, the operation of which is described in paragraphs below. While the guideway 25 in this embodiment has a first movement portion and a second movement portion, the guideway 25 is not limited to such a configuration but may have any suitable configuration. Furthermore, the guide member could utilize a slot or any other suitable configuration in guiding the follower as will be explained.

The cam configuration 31 in this embodiment includes a first guideway wall 32 and a second guideway wall 34. As shown, second guideway wall 34 may have first contact portion 36 and second contact portion 38 formed vertically adjacent each other and integrally connected. In this embodiment the first guideway wall 32 has a relatively curved surface configuration while the first contact portion 36 and second contact portion 38 of the second guideway wall 34 has a relatively curved surface configuration and a relatively flat surface configuration respectively. Of course, any other suitable configuration of the first and second guideway walls 32, 34 may be used. Likewise, any suitable configuration of first and second contact portions 36, 38, may be used.

As illustrated in FIG. 3, the follower 39, in this embodiment a cam 40, may be disposed on extension 24. Cam 40 may be disposed on extension 24 by any suitable means such as by welding or molding. The follower 39, in this embodiment cam 40, cooperates with the guideway 25 of the guide member, in this embodiment the bushing 21 having a cam configuration 31 with a first guideway wall 32 and second guideway wall 34. While the follower in this embodiment is a cam, any other suitable follower configuration could be utilized, such as a projection projecting laterally from the extension 24 and engaging a slot or other suitable configuration of the guide member. Furthermore, while in this embodiment the follower is connected to the extension 24 and the guide member is connected to the seatback frame 13, the follower could also be connected to the seatback frame 13 and the guide member could be connected to the extension 24.

The follower, in this embodiment the cam 40, has a first follower portion 41 and a second follower portion 43. The second follower portion 43 includes a first surface portion 42 and a second surface portion 44 formed vertically adjacent each other and integrally connected. First surface portion 42 may have a relatively flat surface configuration which extends at an angle from and relative to extension 24, to slidably cooperate with first contact portion 36 of second guideway wall 34. However, any other suitable first surface configuration may be used. While an angle of approximately 30 degrees between the first surface portion 42 and the extension 24 has been found to be satisfactory, any suitable angle may be used.

Second surface portion 44 may have a relatively flat surface configuration as shown. In this embodiment, the second surface portion 44 slidably cooperates with second contact portion 38. While the first and second surface portions 42, 44 have been shown in this embodiment to have relatively flat surface configurations, any other suitable surface configurations may be used.

As shown, and as discussed in further detail below, in this embodiment the first and second surface portions 42, 44 slidably contact first and second contact portions 36, 38, respectively, to provide improved head support to the occupant upon vehicle impact. Of course, first surface portion 42 may also slidably contact second contact portion 38 and second surface portion 44 may also slidably contact first contact portion 36 without departing from the spirit or scope of the present invention.

As shown in FIGS. 1–4, in this embodiment the first follower portion 41 extends from extension 24 opposite first and second surface portions 42, 44 to slidably contact the first guideway wall 32. While the first follower portion 41 has been shown in this embodiment to have an arcuately-topped protrusion configuration, any other suitable configuration may be used. During normal use of the vehicle seat and headrest arrangement 10, the first follower portion 41 serves to prevent the extension 24 from shifting back and forth, and to provide a substantially snug fit within the guide member, in this embodiment the bushing 21.

However, upon vehicle impact, first and second follower portions 41, 43 and first and second guideway walls 32, 34, are configured to cooperate together to move headrest 22 in first and second manners, e.g., first and second forward velocities and first and second trajectories of headrest 22. More specifically, upon impact of the vehicle, an occupant of the vehicle provides rearward load on impact target 26. In turn, connectors 28 pivot about axis A and the impact target 28 moves in a generally rearward and upward direction. As a result, extension 24 slides upwardly through the guideway 25 of the guide member, in this embodiment the bushing 21, and first surface portion 42 slides along first contact portion 36, and first follower portion 41 slides along first guideway wall 32. This movement, movement in the first manner, defines the first forward velocity and first trajectory of headrest 22 toward and relative to the occupant's head. This movement also defines the first movement portion. More specifically, this movement in the first manner causes the headrest 22 of the headrest arrangement 14 to pivot with respect to the seatback frame 13 along a first trajectory about and above a constant or shifting axis. The first trajectory and the force of the impact define a first forward velocity of the headrest 22 toward the head of the seat occupant.

Then, the second surface portion 44 slides along second contact portion 38, as follower portion 41 continues to slide along and past first guideway wall 32. This movement, movement in the second manner, defines the second velocity and second trajectory of headrest 22 toward and relative to the occupant's head. This movement also defines the second movement portion. More specifically, this movement in the second manner causes the headrest 22 of the headrest arrangement 10 to pivot with respect to the seatback frame 13 along a second trajectory about and above a constant or shifting axis. The second trajectory and the force of the impact define a second forward velocity of the headrest 22 toward the head of the seat occupant.

Each of the constant or shifting axes is the pivot axis, also called the instant center axis, instantaneous pivot axis, or instantaneous axis, about which the headrest 22 pivots at any given time during movement along a particular trajectory.

In the embodiments shown, the pivot axis, also called the instant center axis, instantaneous pivot axis, or instantaneous axis, about which the headrest portion pivots shifts throughout the trajectories of the headrest 22 during a rearward loading of the impact target. Shifting the instantaneous axis downwardly allows the headrest 22 to move in a more forwardly direction toward the occupant's head upon a rearward force to the impact target. Preferably, the vehicle seat and headrest arrangement is such that the instantaneous axis shifts within a relatively lower range of positions during camming between the first surface portion 42 and the first contact portion 36. The resulting trajectory is such that the headrest 22 will move in a direction more directed toward the occupant's head during the course of the first trajectory. Shifting the instantaneous axis upwardly, within a relatively higher range of positions, after the movement in the first manner has been accomplished, allows the headrest 22 to move more upwardly, and support the occupant's head, during movement in the second manner. In the embodiments shown, the cam is formed such that the instantaneous axis shifts upwardly upon contact of the second surface portion with the second contact portion 38.

In summary, upon vehicle impact, the headrest 22 moves forwardly and upwardly in first and second manners, along first and the second trajectories, and at first and second forward velocities. The greater the crash acceleration, the greater the velocity of headrest 22 in the first and second manners.

Although both trajectories provide for both forward and upward movement of the headrest 22, the first trajectory allows the headrest 22 to move more forwardly and the second trajectory allows the headrest 22 to move more upwardly. The first forward velocity is preferably greater than the second forward velocity. The first forward velocity allows the headrest 22 to quickly move a predetermined distance to lessen the gap between the occupant's head and the headrest 22. The second velocity allows the headrest 22 to further lessen the gap and to slow down or stop relative to the seat occupant's head for supporting the occupant's head upon contact.

In this particular embodiment, headrest 22 moves in a forward and upward direction for a predetermined distance toward the occupant's head in order to lessen the gap therebetween. More specifically, during movement of the headrest 22 in the first and second trajectories, the headrest 22 is configured to move forward a predetermined distance. While a distance range between 2 and 25 centimeters may be suitable, any suitable distance may be used and will be dependent, at least in part, on the interior design parameters of the particular vehicle.

In the particular embodiment shown, due to the configuration of the first surface portion 42 and the first contact portion 36, the headrest 22 moves more forwardly than upwardly to define the first trajectory, providing the first forward velocity. Due to the configuration of the second surface portion 44 and the second contact portion 38, the headrest 22 moves more upwardly than forwardly to define the second trajectory, providing the second forward velocity. Thus, in this embodiment, the first forward velocity is greater then the second forward velocity in the direction toward the head of the vehicle occupant. Accordingly, surface portions 44, 46 and contact portions 36, 38 are designed to reduce headrest 22 movement directly toward the occupant's head after movement in the first manner.

In normal vehicle seat and headrest arrangements, during the initial stages of an impact, the occupant's torso is in contact with the seatback while the occupant's head is several inches forward of the headrest 22. This condition is consistent with the body being reclined at about 20–25 degrees from vertical with the neck being approximately vertical. In contrast, the seat is usually at a reclined angle of approximately 20–25 degrees from vertical, with the headrest either following the inclination of the seatback or curving slightly forward. In any event, for seating comfort, the head is usually not in contact with the headrest while driving.

As the occupant loads the seatback in an impact, force builds up behind the torso and buttocks of the seat occupant as the head, neck, torso, and buttocks move in unison. Typically, there is a greater compression in the torso and buttocks regions of the seat, with a gradual reduction up to the shoulder level as the body remains upright. The more severe the crash, the greater the compression of the occupant into the seatback. As this action is occurring, the initial load of the occupant tends to deflect the seatback rearwardly. The amount of deflection is related to the bending stiffness of the seatback. The seatback may possibly deflect under the torso load prior to the head and neck of the occupant contacting the headrest. The current invention reduces this "whiplash" effect by bringing the headrest forward into a head supporting position.

Figure 5:
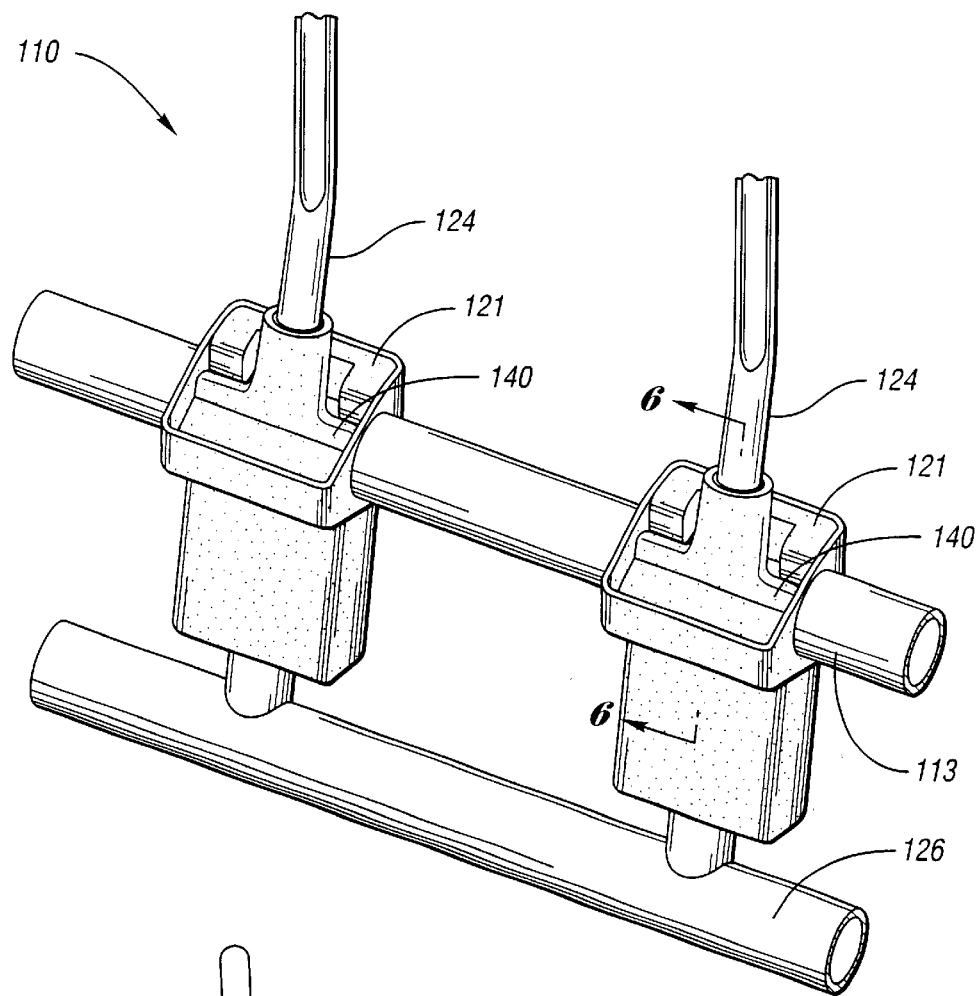
FIG. 5 is a perspective view of another embodiment of the variable pivot mechanism in accordance with the present invention.
Figure 6:
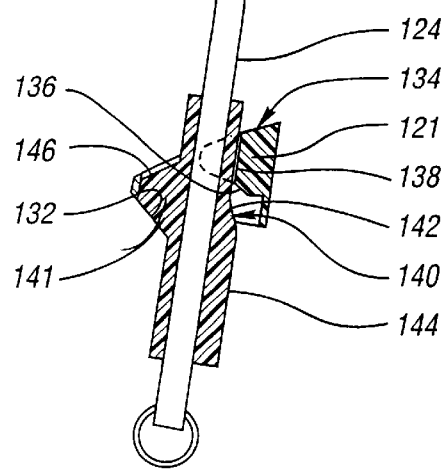
FIG. 6 is a cross-sectional view of the embodiment in FIG. 5 taken along lines 6—6.

FIGS. 5 and 6 depict another embodiment which operates similar to the embodiment described above. This embodiment includes components similar to components of vehicle seat and headrest arrangement 10 above. Similar components will be referred to by the same reference characters used to identify like components in the first embodiment. However, in this embodiment, a different guide member, bushing 121, is disposed on seatback frame 113 and includes a first guideway wall 132 and second guideway wall 134 having a pair of first and second contact portions 136, 138. A follower, in this embodiment a cam 140, is disposed on extension 124 and includes a pair of first and second surface portions 142, 144 formed to cooperate with the pair of first and second contact portions 136, 138, respectively. As shown, the first guideway wall 132 includes a planar surface upon which a first follower portion 141 slides during movement of the headrest arrangement 114. Similar to the embodiment described above, the first and second surface portions 142, 144 slidably contact the first and second contact portions 136, 138, respectively, to define first and second forward velocities and first and second trajectories of the headrest 22 during vehicle impact and to accordingly provide improved head support to the occupant upon vehicle impact.

While not shown, as a further alternative example embodiment, the invention may be constructed such that the impact target 26 is not connected to the side member 18. In such an embodiment, the impact target could be supported in the non-impact position via a guide member and follower for example.

It is to be noted that the embodiments described above may be made by any conventional means using any conventional materials known in the vehicle seating art.

Figure 7:
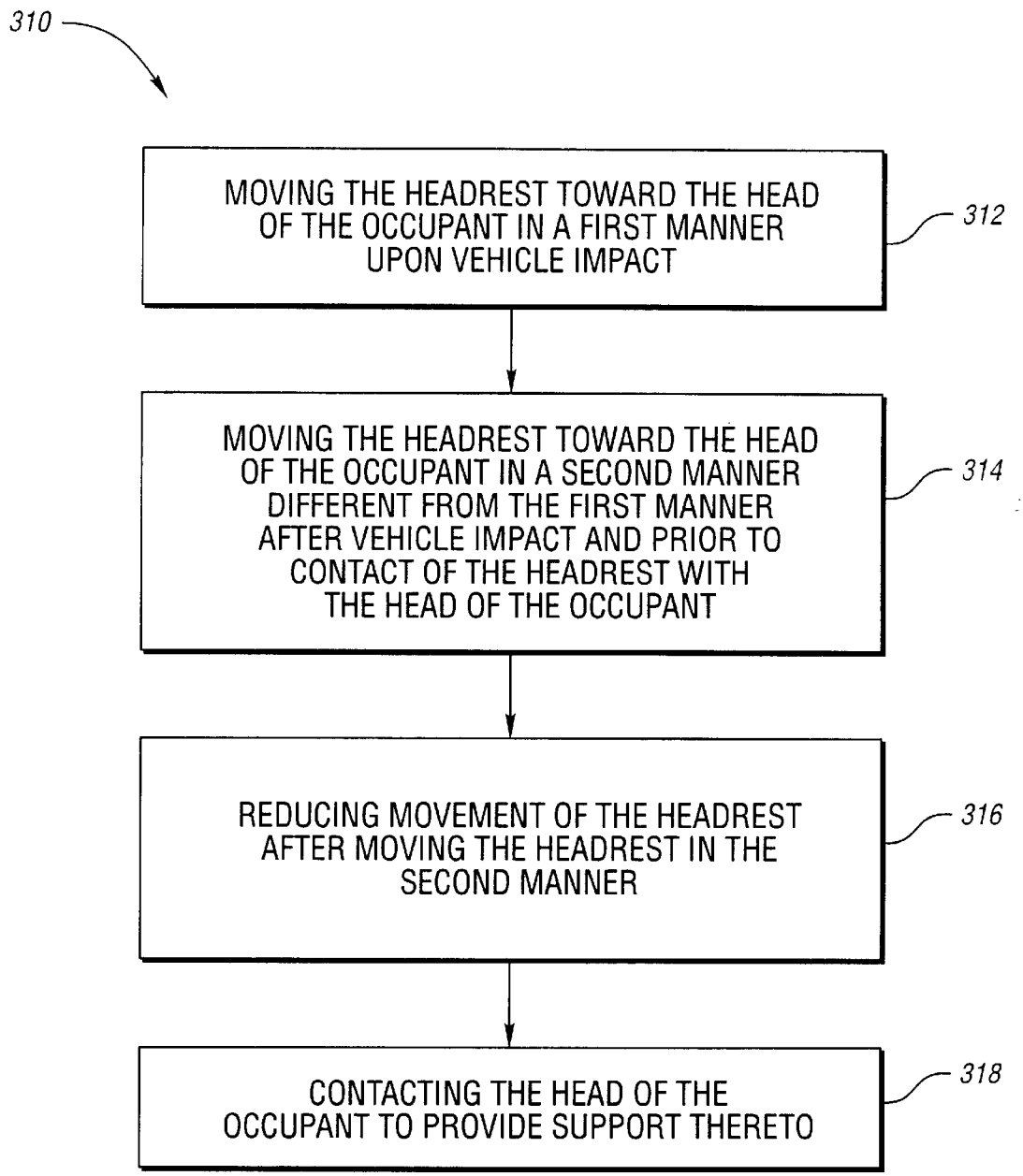
FIG. 7 is a flow chart of one method of providing head support with a movable headrest of a vehicle seat to a vehicle occupant head during impact of the vehicle.

FIG. 7 depicts a method 310 of providing head support to an occupant of a vehicle during impact of the vehicle. Method 310 includes moving the headrest toward the head of the occupant in a first manner upon vehicle impact in block 312. A resulting rearward force of the occupant contacting the impact target initiates movement of the headrest in the first manner, such as a first trajectory and a first forward velocity as described above. Then, in block 314, method 310 includes moving the headrest toward the head of the occupant in a second manner, along second trajectory and at a second forward velocity, different from the first manner. The second manner includes a second trajectory and a second forward velocity of the headrest. It is preferred that the first trajectory is directed more forwardly than the second trajectory, and the first forward velocity is greater than the second forward velocity. Method 310 further includes reducing movement of the headrest after moving the headrest in the second manner, preferably prior to contact with the occupant's head, in block 316. Although the headrest may contact the occupant's head while moving along the second trajectory, it is preferred that the headrest is at a reduced velocity or stationary upon contact with the head. Furthermore, in block 318, method 310 includes contacting the occupant's head to provide support, lessening whiplash to the occupant's head upon impact of the vehicle.

While embodiments of the invention have been illustrated and described, it is not intended that these embodiments illustrate and describe all possible forms of the invention as claimed. It is understood that various changes or modifications may be made without departing from the spirit and scope of the claimed invention.

What is claimed is:

1. A vehicle seat and headrest arrangement for use with a seat having a seatback in a vehicle, the vehicle seat and headrest arrangement comprising:
   a headrest arrangement including a headrest, an impact target, and one of a guide member and a follower;
   the seatback having the other one of a guide member and follower, the guide member having a guideway and the follower extending laterally and engaging the guideway of the guide member such that upon impact to the vehicle a rearward load by the occupant upon the impact target will cause the follower to engage the guideway in such a manner to cause the headrest to be moved in a first manner and a second manner to support a head of an occupant.

2. The vehicle seat and headrest arrangement of claim 1 wherein the guide member is a bushing having a cam configuration and the follower is a cam such that engagement of the cam and cam configuration together with a the forward momentum of the headrest cause the headrest to move in the first manner and the second manner.

3. The vehicle seat and headrest arrangement of claim 1 wherein the guideway has a first guideway wall and a second guideway wall and the follower has a first follower portion and a second follower portion which engage the first guideway wall and second guideway wall respectively to cause the headrest to move in the first manner and the second manner to support the head of the occupant.

4. The vehicle seat and headrest arrangement of claim 3 wherein the second guideway wall has a first contact portion and a second contact portion and the second follower portion has a first surface portion and a second surface portion such that upon impact to the vehicle, the first surface portion slidingly engages the first contact portion while the first follower portion slidingly engages the first guideway wall so as to cause the headrest to move in the first manner before the second surface portion slidingly engages the second contact portion as the first follower portion continues to slidingly engage the first guideway wall so as to cause the headrest to move in the second manner.

5. The vehicle seat and headrest arrangement of claim 4 wherein the first contact portion has a relatively curved surface configuration, the second contact portion has a relatively flat surface configuration, the first and second surface portions have relatively flat surface configurations, the first guideway wall has a relatively curved surface configuration, and first follower portion has an arcuately-topped protrusion configuration.

6. The vehicle seat and headrest arrangement of claim 1 further including a movement-allowing connector connected between the headrest arrangement and the seatback.

7. The vehicle seat and headrest arrangement of claim 6 wherein the seatback has a seatback frame having side members and the movement-allowing connector is at least one link pivotally connected between the side members of the seatback frame and the impact target.

8. The vehicle seat and headrest arrangement of claim 7 wherein the link is connected to the side member along a pivot axis and the pivot axis is offset relative to the impact target such that a rearward force of an occupant on the impact target will tend to cause the impact target to move in a generally rearward and upward direction and move the headrest arrangement.

9. The vehicle seat and headrest arrangement of claim 1 further including a biasing member operatively associated with the seatback and the headrest arrangement which tends to bias headrest against movement in the first manner and the second manner.

10. The vehicle seat and headrest arrangement of claim 1 wherein movement in the first manner is movement on a first trajectory and at a first forward velocity and movement in the second manner is movement on a second trajectory and at a second forward velocity which is less than the first forward velocity.

11. The vehicle seat and headrest arrangement of claim 1 wherein movement in the first manner quickly decreases a distance between the headrest and the head of the occupant, while movement in the second manner decreases a velocity of the headrest forward the head of the occupant so as to provide support upon contact with the head.

12. A vehicle seat and headrest arrangement for use with a seat having a seatback in a vehicle, the vehicle seat and headrest arrangement comprising:
   a headrest arrangement including a headrest and a headrest extension, the headrest extension having one of a guide member and a follower and an impact target located below the one of a guide member and a follower;
   a seatback frame of the seatback having side members and an upper cross frame member, the upper cross frame member having the other of a guide member and follower, the guide member having a guideway and the follower extending laterally and slidingly engaging the guideway of the guide member such that upon impact to the vehicle a rearward load by an occupant upon the impact target will cause the follower to be slidably guided by the guideway such that the headrest is moved in a first manner and a second manner.

13. The vehicle seat and headrest arrangement of claim 12 further including a movement-allowing connector connected between the headrest arrangement and the seatback frame.

14. The vehicle seat and headrest arrangement of claim 13 wherein the movement-allowing connector is at least one link pivotally connected between the side members of the seatback frame and the impact target and the link is connected to the side member along a pivot axis offset relative to the impact target such that a rearward force of an occupant on the impact target will tend to cause the impact target to move in a generally rearward and upward direction and move the headrest arrangement.

15. The vehicle seat and headrest arrangement of claim 13 further including a biasing member operatively associated with the seatback and the headrest arrangement which tends to bias headrest against movement in the first and second manner.

16. The vehicle seat and headrest arrangement of claim 12 wherein the guide member is fixedly attached to the seatback frame and has a first guideway wall and a second guideway wall and the follower is fixedly attached to the headrest extension and has a first follower portion and a second follower portion which slidingly engage the first guideway wall and second guideway wall respectively.

17. The vehicle seat and headrest arrangement of claim 16 wherein the second guideway wall has a first contact portion and a second contact portion and the second follower portion has a first surface portion and a second surface portion such that upon impact to the vehicle, the first surface portion slidingly engages the first contact portion while the first follower portion slidingly engages the first guideway wall so as to cause the headrest to move in the first manner before the second surface portion slidingly engages the second contact portion as first follower portion continues to slidingly engage the first guideway wall so as to cause the headrest to move in the second manner.

18. The vehicle seat and headrest arrangement of claim 17 wherein the first contact portion has a relatively curved surface configuration, the second contact portion has a relatively flat surface configuration, the first and second surface portions have relatively flat surface configurations, the first guideway wall has a relatively curved surface configuration, and first follower portion has an arcuately-topped protrusion configuration.

19. The vehicle seat and headrest arrangement of claim 12 wherein movement in the first manner is movement on a first trajectory and at a first forward velocity and movement in the second manner is movement on a second trajectory which is generally more upwardly than the first trajectory and a second forward velocity which is less than the first forward velocity.

20. A vehicle seat and headrest arrangement for use with a seat having a seatback in a vehicle, the vehicle seat and headrest arrangement comprising:
a headrest arrangement including a headrest, a headrest extension extending from the headrest, a laterally extending follower fixedly connected to the headrest extension, and an impact target located below the follower;
a seatback frame of the seatback having side members and an upper cross frame member, the upper cross frame member having a guide member fixedly connected to the cross frame member through which the follower extends, the guide member having a guideway and the follower slidingly engaging the guideway of the guide member such that upon impact to the vehicle a rearward load by an occupant upon the impact target will cause the follower to be slidably guided by the guideway such that the headrest is moved in a first manner and a second manner.

21. The vehicle seat and headrest arrangement of claim 20 further including a movement-allowing connector and a biasing member, the movement-allowing connector being at least one link pivotally connected between the side members of the seatback frame and the impact target and the link being connected to the side member along a pivot axis offset relative to the impact target such that a rearward force of an occupant on the impact target will tend to cause the impact target to move in a generally rearward and upward direction and move the headrest assembly, the biasing member being operatively connected between the seatback frame and the headrest arrangement so as to bias headrest against movement in the first and second manner.

22. The vehicle seat and headrest arrangement of claim 21 wherein movement in the first manner is movement on a first trajectory and at a first forward velocity and movement in the second manner is movement on a second trajectory which is generally more upwardly than the first trajectory and a second forward velocity which is less than the first forward velocity.

23. The vehicle seat and headrest arrangement of claim 22 wherein the second guideway wall has a first contact portion and a second contact portion and the second follower portion has a first surface portion and a second surface portion such that upon impact to the vehicle, the first surface portion slidingly engages the first contact portion while the first follower portion slidingly engages the first guideway wall so as to cause the headrest to move in the first manner before the second surface portion slidingly engages the second contact portion as first follower portion continues to slidingly engage the first guideway wall so as to cause the headrest to move in the second manner.

24. The vehicle seat and headrest arrangement of claim 23 wherein the first contact portion has a relatively curved surface configuration, the second contact portion has a relatively flat surface configuration, the first and second surface portions have relatively flat surface configurations, the first guideway wall has a relatively curved surface configuration, and first follower portion has an arcuately-topped protrusion configuration.

25. A seat and headrest arrangement for use in a vehicle comprising:
a headrest arrangement including a headrest, an impact target, and one of a guide member and a follower; and
a seatback having the other one of a guide member and follower, the guide member having a guideway and the follower engaging the guideway such that upon impact to the vehicle a rearward load by the occupant upon the impact target will cause the follower to engage the guideway to cause the headrest to be moved in a first manner and a second manner to support a head of an occupant;
wherein the guide member is a bushing having a cam configuration and the follower is a cam such that engagement of the cam and cam configuration together with a forward momentum of the headrest causes the headrest to move in the first manner and the second manner.

* * * * *

UNITED STATES PATENT AND TRADEMARK OFFICE
CERTIFICATE OF CORRECTION

PATENT NO.     : 6,631,949 B2
DATED          : October 14, 2003
INVENTOR(S)    : Mladen Humer et al.

It is certified that error appears in the above-identified patent and that said Letters Patent is hereby corrected as shown below:

Column 11,
Line 23, please delete "with a the" and insert therefor -- with a --.

Signed and Sealed this

Second Day of March, 2004

JON W. DUDAS
*Acting Director of the United States Patent and Trademark Office*